United States Patent
Cajias et al.

(10) Patent No.: US 11,868,788 B2
(45) Date of Patent: Jan. 9, 2024

(54) METHOD AND APPARATUS FOR APPLICATION PLUG-IN MANAGEMENT

(71) Applicant: HERE Global B.V., Eindhoven (NL)

(72) Inventors: Raul Cajias, Berlin (DE); Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/518,999

(22) Filed: Nov. 4, 2021

(65) Prior Publication Data

US 2023/0133624 A1    May 4, 2023

(51) Int. Cl.
*G06F 9/451*    (2018.01)
*G06T 11/60*    (2006.01)
*G06F 8/61*    (2018.01)
*G06F 9/445*    (2018.01)

(52) U.S. Cl.
CPC ............... *G06F 9/451* (2018.02); *G06F 8/61* (2013.01); *G06F 9/44526* (2013.01); *G06T 11/60* (2013.01); *G06T 2200/24* (2013.01)

(58) Field of Classification Search
CPC ........ G06F 9/451; G06F 8/61; G06F 9/44526; G06T 11/60; G06T 2200/24
See application file for complete search history.

(56) References Cited

U.S. PATENT DOCUMENTS

| | | | | |
|---|---|---|---|---|
| 8,453,065 | B2 * | 5/2013 | Chaudhrl | G06F 3/04817 715/709 |
| 9,229,702 | B1 * | 1/2016 | Kapulkin | G06F 8/65 |
| 9,846,682 | B1 * | 12/2017 | Righetto | G06F 40/106 |
| 9,875,129 | B2 | 1/2018 | Murray | |
| 9,878,240 | B2 | 1/2018 | Gault et al. | |
| 9,959,019 | B1 * | 5/2018 | Qureshi | G06F 9/44526 |
| 10,402,049 | B1 * | 9/2019 | Lyman | G06F 8/38 |
| 11,030,385 | B2 * | 6/2021 | Mowatt | G06F 8/61 |
| 2004/0090458 | A1 * | 5/2004 | Yu | G06F 9/45512 715/760 |
| 2007/0101288 | A1 * | 5/2007 | Forstall | G06F 3/0488 715/779 |
| 2008/0034314 | A1 * | 2/2008 | Louch | G06F 3/0481 715/764 |
| 2009/0172576 | A1 * | 7/2009 | Cheaz | G06F 9/451 715/765 |

(Continued)

FOREIGN PATENT DOCUMENTS

WO    WO-2018089940 A1 *    5/2018    ............. G06F 9/452

*Primary Examiner* — Patrick F Riegler
(74) *Attorney, Agent, or Firm* — DITTHAVONG, STEINER, & MLOTKOWSKI

(57) ABSTRACT

An apparatus and method are disclosed for obtaining a simulated preview that depicts a representation of one or more user interface changes associated with an application plug-in. The approach involves, for example, rendering the simulated preview overlaid on a user interface of an application executing on a device. The rendering aligns the representation of the one or more user interface changes over the user interface to depict a preview of the one or more user interface changes that will occur after an installation of the application plug-in. The approach also involves rendering the simulated preview along with one or more simulated previews of installed plug-ins overlaid in a staked view on the user interface of the application. Addition and/or deletion of plug-ins can be managed in the stacked view.

17 Claims, 11 Drawing Sheets

(56) References Cited

U.S. PATENT DOCUMENTS

| | | | |
|---|---|---|---|
| 2010/0262904 A1* | 10/2010 | Chou | G06F 16/9577 715/240 |
| 2011/0022571 A1 | 1/2011 | Snyder | |
| 2012/0284632 A1* | 11/2012 | Baird | G06F 9/452 715/749 |
| 2013/0145361 A1 | 6/2013 | Kaegi | |
| 2014/0245197 A1* | 8/2014 | Swanke | G06Q 10/10 715/762 |
| 2015/0317405 A1* | 11/2015 | Manchester | G06F 16/986 715/234 |
| 2016/0292135 A1 | 10/2016 | Mowatt et al. | |
| 2017/0278289 A1* | 9/2017 | Marino | G06T 7/536 |
| 2020/0081696 A1 | 3/2020 | Zmijewski et al. | |
| 2020/0341718 A1* | 10/2020 | Hiskey | G11B 27/34 |
| 2021/0397313 A1* | 12/2021 | Desai | G06F 3/0482 |

\* cited by examiner

100

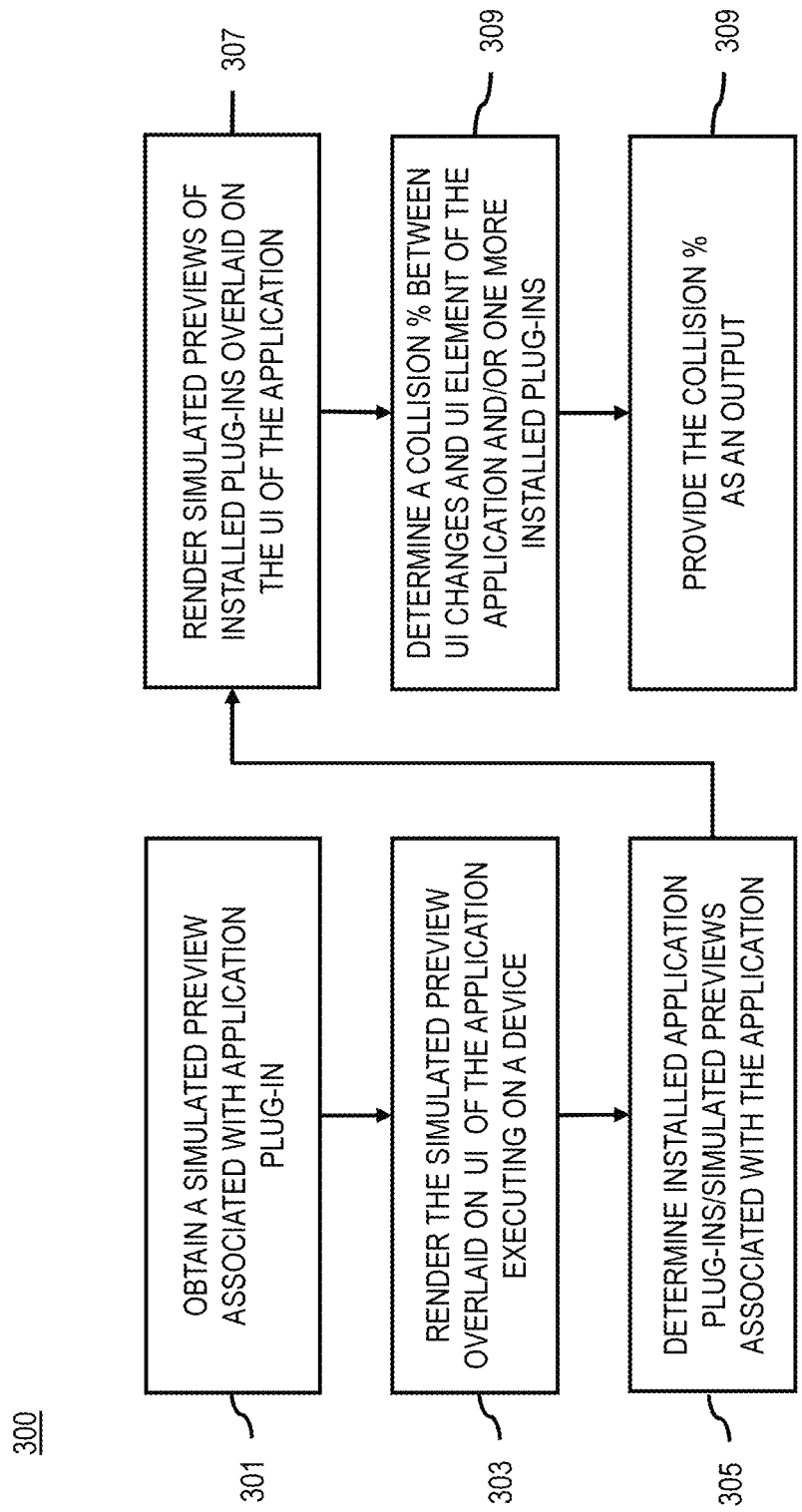

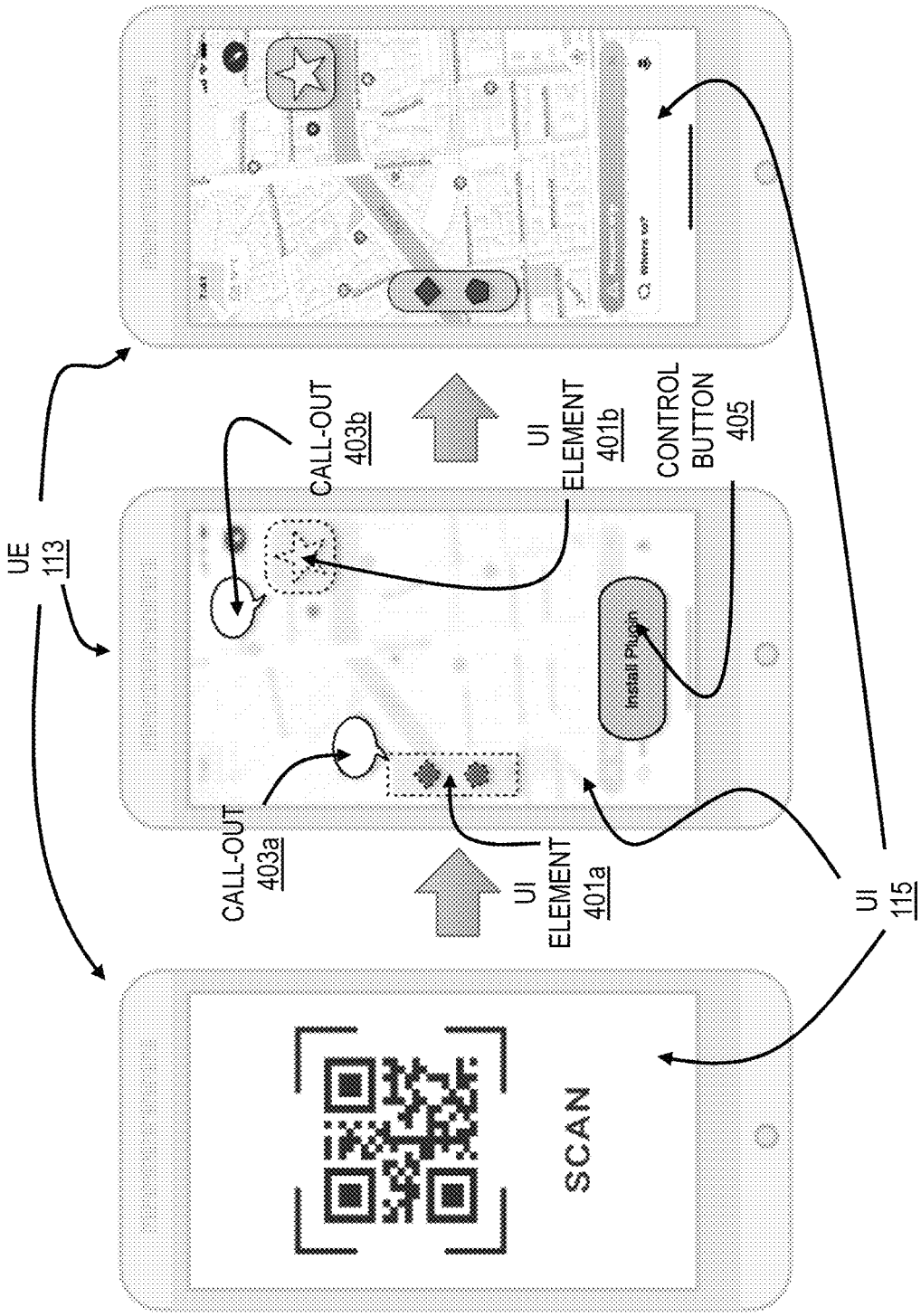

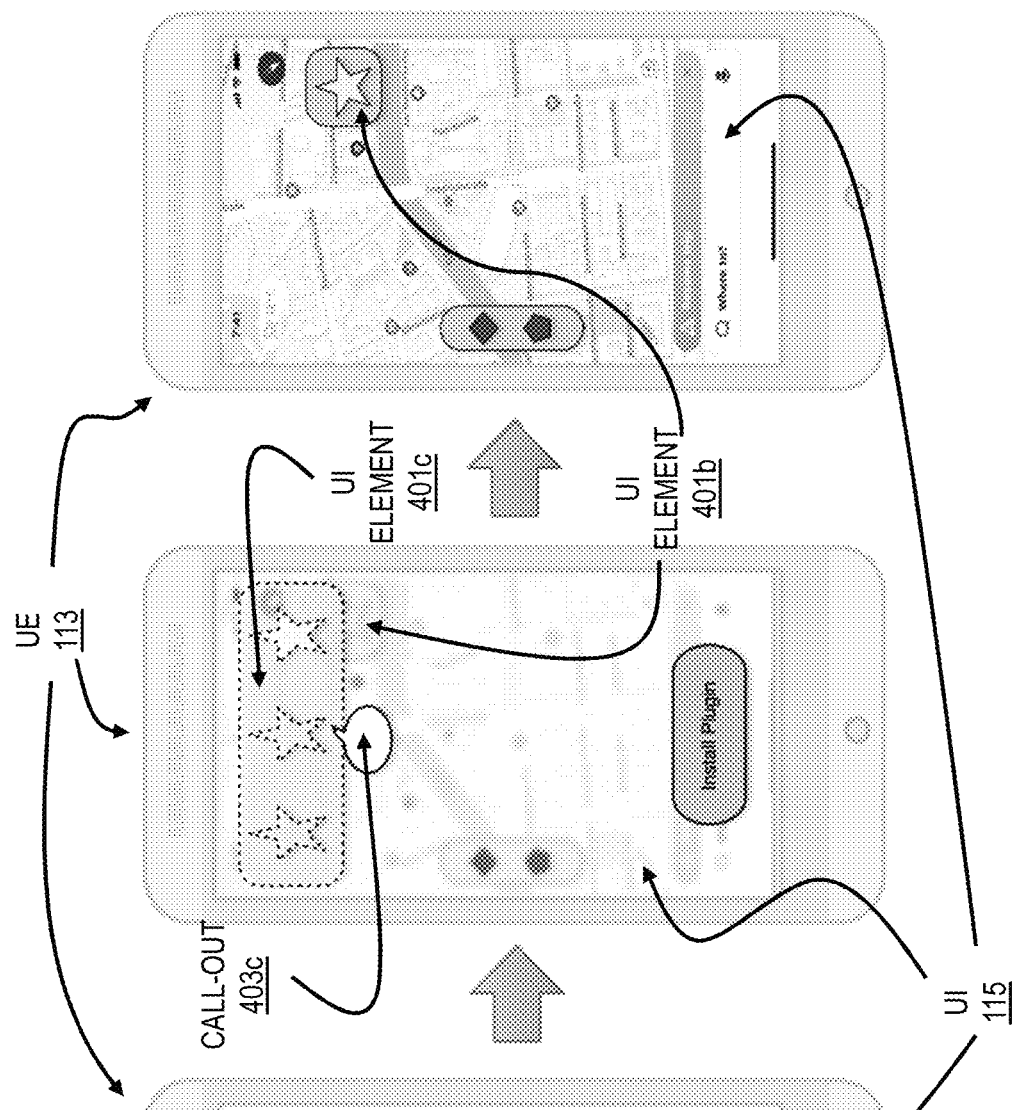

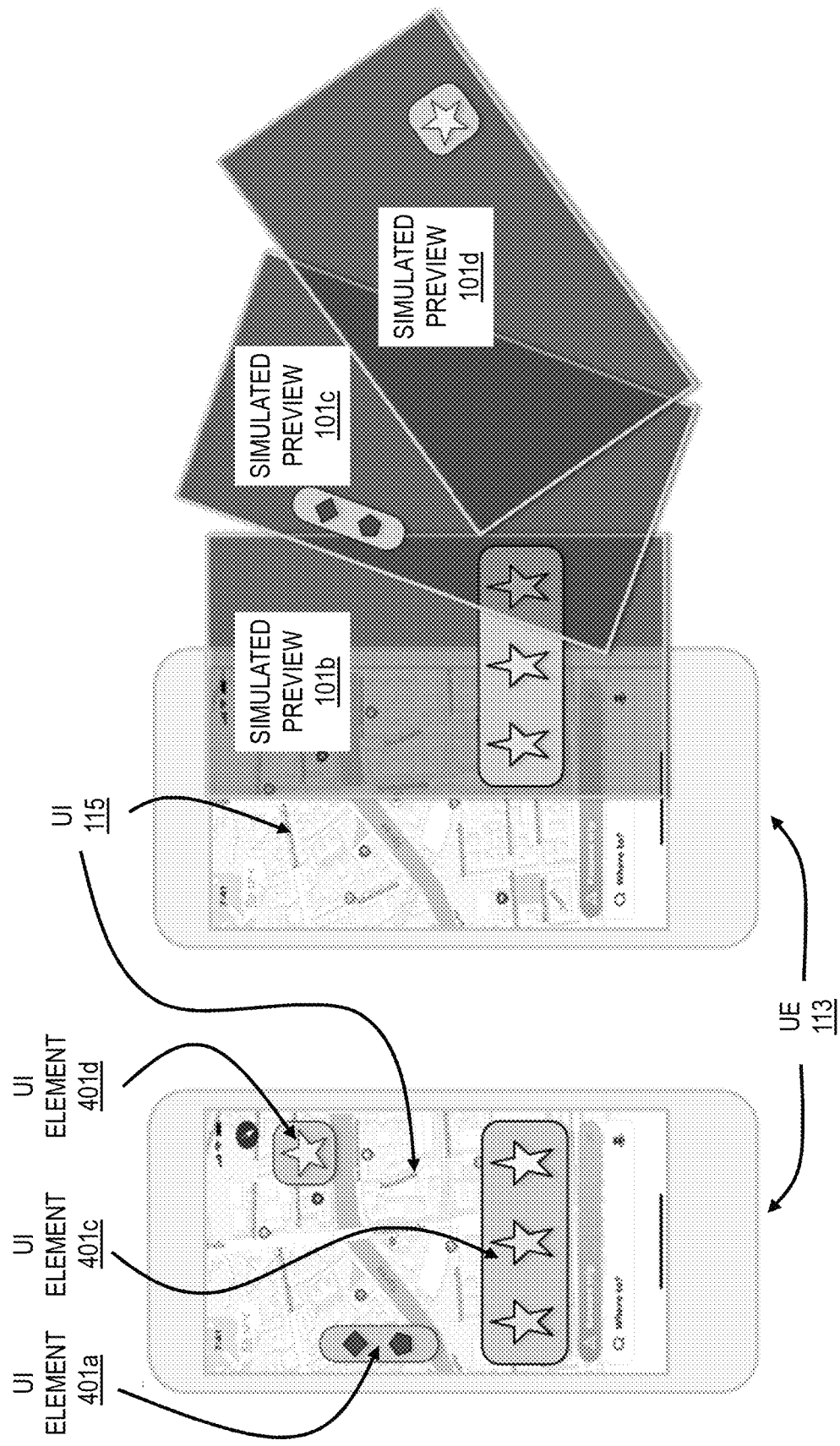

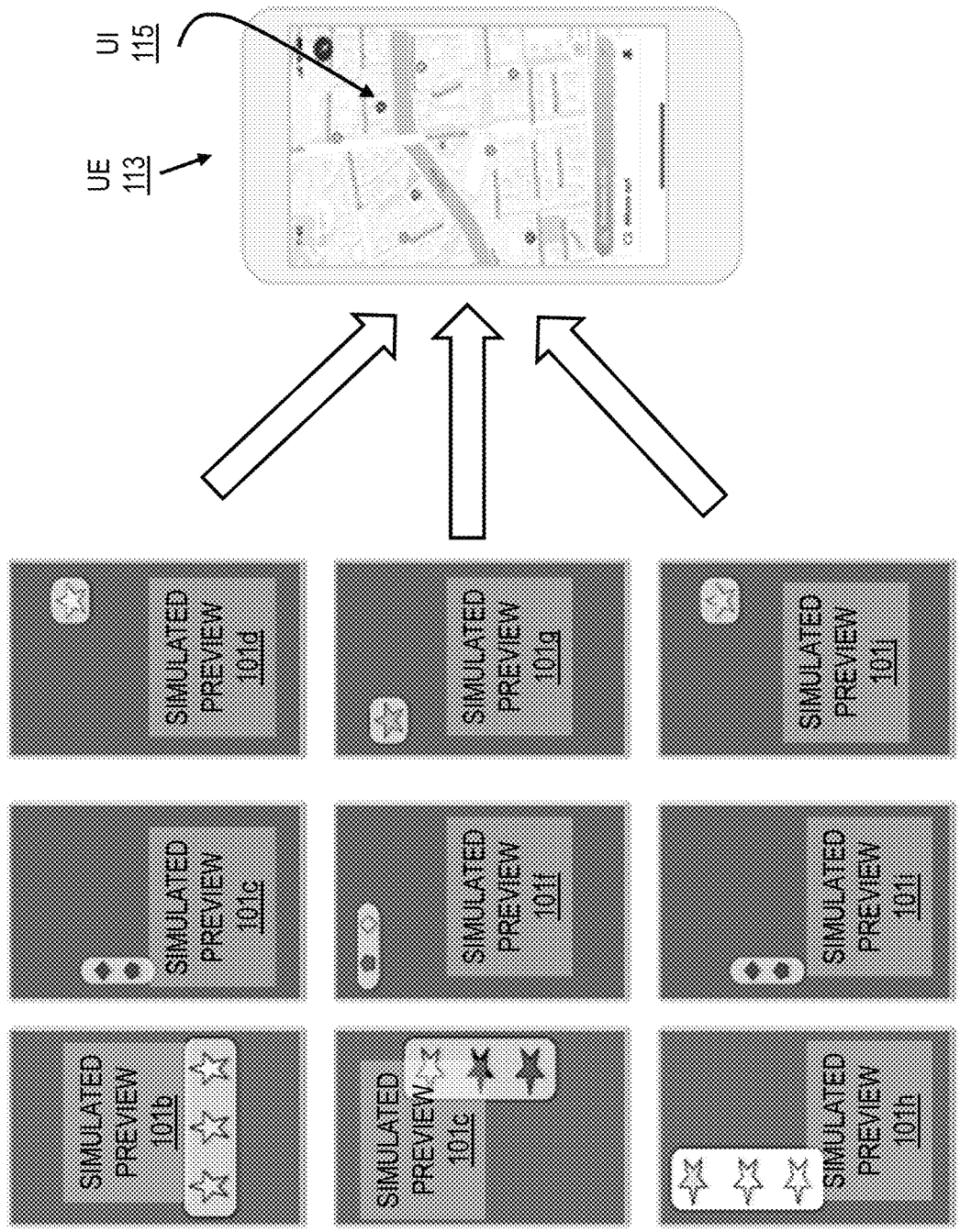

METHOD AND APPARATUS FOR APPLICATION PLUG-IN MANAGEMENT

BACKGROUND

Service providers and device manufacturers (e.g., wireless, cellular, etc.) are continually challenged to deliver value and convenience to consumers by, for example, providing compelling network services and advancing underlying technologies. Extensible applications allow users to customize the look and feel of the application, as well as to extend the functionality through the use of plug-in applications, or plug-ins. However, to find such plug-ins, a user must find and search libraries of plug-ins to locate plug-ins that might provide the desired modifications and/or enhancements to the user interface for a particular application. Accordingly, plug-in providers face significant technical problems to enable users to efficiently and conveniently discover and/or manage the installation of application plug-ins.

SOME EXAMPLE EMBODIMENTS

Therefore, there is a need for an approach for simplifying the user experience related to management of plug-ins in terms of evaluating potential installation of one or more plug-ins, maintenance of plug-ins already installed on a device, and/or browsing catalogs of available plug-ins.

According to one embodiment, a method comprises obtaining a simulated preview that depicts a representation of one or more user interface changes associated with an application plug-in. The method also comprises rendering the simulated preview overlaid on a user interface of an application executing on a device, wherein the rendering aligns the representation of the one or more user interface changes over the user interface to depict a preview of the one or more user interface changes that will occur after an installation of the application plug-in. The method further comprises determining one or more installed application plug-ins associated with the application, obtaining one or more other simulated previews of the one or more installed application plug-ins, and rendering the one or more other simulated previews overlaid on the user interface of the application, wherein an interaction with the one or more other simulated previews initiates a modification of an installation of at least one of the one or more installed application plug-ins. The method further comprises rendering a stacked view of the plug-in preview in combination with one or more other simulated previews of one or more other installed application plug-ins.

According to another embodiment, an apparatus comprising at least one processor, and at least one memory including computer program code, the at least one memory and the computer program code configured to, with the at least one processor, cause the apparatus to obtain a simulated preview that depicts a representation of one or more user interface changes associated with an application plug-in. The apparatus is also caused to render the simulated preview overlaid on a user interface of an application executing on a device, wherein the rendering aligns the representation of the one or more user interface changes over the user interface to depict a preview of the one or more user interface changes that will occur after an installation of the application plug-in. The apparatus is further caused to determine one or more installed application plug-ins associated with the application, obtaining one or more other simulated previews of the one or more installed application plug-ins, and rendering the one or more other simulated previews overlaid on the user interface of the application, wherein an interaction with the one or more other simulated previews initiates a modification of an installation of at least one of the one or more installed application plug-ins. The apparatus is further caused to render a stacked view of the plug-in preview in combination with one or more other simulated previews of one or more other installed application plug-ins.

According to another embodiment, a computer-readable storage medium carrying one or more sequences of one or more instructions which, when executed by one or more processors, cause an apparatus to obtain a simulated preview that depicts a representation of one or more user interface changes associated with an application plug-in. The apparatus is also caused to render the simulated preview overlaid on a user interface of an application executing on a device, wherein the rendering aligns the representation of the one or more user interface changes over the user interface to depict a preview of the one or more user interface changes that will occur after an installation of the application plug-in. The apparatus is further caused to determine one or more installed application plug-ins associated with the application, obtaining one or more other simulated previews of the one or more installed application plug-ins, and rendering the one or more other simulated previews overlaid on the user interface of the application, wherein an interaction with the one or more other simulated previews initiates a modification of an installation of at least one of the one or more installed application plug-ins. The apparatus is further caused to render a stacked view of the plug-in preview in combination with one or more other simulated previews of one or more other installed application plug-ins.

According to another embodiment, a computer program product comprising instructions which, when executed by one or more processors, cause an apparatus to obtain a simulated preview that depicts a representation of one or more user interface changes associated with an application plug in. The apparatus is also caused to render the simulated preview overlaid on a user interface of an application executing on a device, wherein the rendering aligns the representation of the one or more user interface changes over the user interface to depict a preview of the one or more user interface changes that will occur after an installation of the application plug in. The apparatus is further caused to determine one or more installed application plug ins associated with the application, obtaining one or more other simulated previews of the one or more installed application plug ins, and rendering the one or more other simulated previews overlaid on the user interface of the application, wherein an interaction with the one or more other simulated previews initiates a modification of an installation of at least one of the one or more installed application plug ins. The apparatus is further caused to render a stacked view of the plug in preview in combination with one or more other simulated previews of one or more other installed application plug ins.

According to another embodiment, an apparatus comprises means for obtaining a simulated preview that depicts a representation of one or more user interface changes associated with an application plug-in. The apparatus also comprises means for rendering the simulated preview overlaid on a user interface of an application executing on a device, wherein the rendering aligns the representation of the one or more user interface changes over the user interface to depict a preview of the one or more user interface changes that will occur after an installation of the application plug-in. The apparatus further comprises means for determining one or more installed application plug-ins associated with the application, obtaining one or more other simulated previews of the one or more installed application plug-ins, and rendering the one or more other simulated previews overlaid on the user interface of the application, wherein an interaction with the one or more other simulated previews initiates a modification of an installation of at least one of the one or more installed application plug-ins. The apparatus further comprises means for rendering a stacked view of the plug-in preview in combination with one or more other simulated previews of one or more other installed application plug-ins.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for capable of providing plug-in management via simulated previews, according to one embodiment;

FIGS. 4A-4J are diagrams of user interfaces utilized in the processes of FIG. 3, according to various embodiments;

DESCRIPTION OF PREFERRED EMBODIMENT

Figure 1:
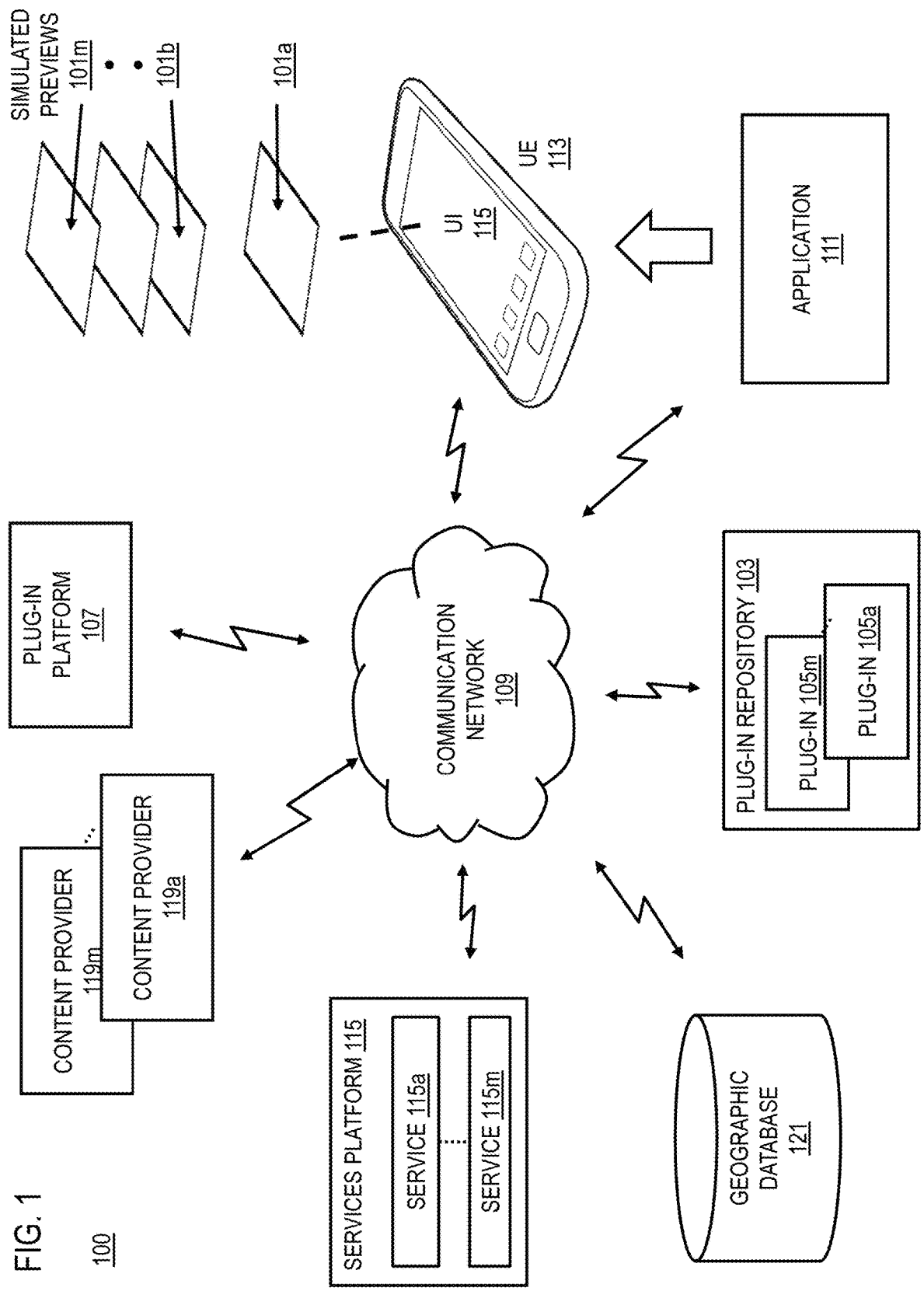
FIG. 1 is a diagram of a system capable of providing plug-in management via simulated previews, according to one embodiment.

A method and apparatus for obtaining a simulated preview that depicts a representation of one or more user interface ("UP") changes associated with an application plug-in and rendering the simulated preview overlaid on a UI of an application executing on a device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "plug-in" refers to an add-on application or program that extends the functionality and/or UI of another application. Plug-in generally (but not always) are implemented using standardized application programming interfaces (APIs) or equivalent that provide the additional functionality and/or UI elements without changing the source code of the of the original or host application. Original or host applications that support plug-ins (e.g., via APIs or equivalent) can also be referred to as "extensible applications" or "super apps." By way of example, software developers can use plug-ins to add new features, reduce the size of an application by not loading unused optional features, separate source code from an application because of incompatible software licenses, and/or the like. A plug-in is sometimes referred to as an "add-on" or an "extension."

As used herein, the term "super app" refers to the provision of or access to several services from a single application or umbrella application. For example, some applications that started with a single function, such as messaging, have expanded into super apps, including additional services such as payments, cabs, shopping, food ordering, and/or cab services, all available through accessing the super app. Some super apps are designed to allow utilization of plug-ins to facilitate modification to the look and feel, enhanced functionality, and/or enhanced interactivity of individual services offered within the super app.

As used herein, the term "simulated preview" refers to a representation of one or more user interface changes associated with an application plug-in that is obtained without any change to the code of the application with which the plug-in is associated. In some embodiments, a simulated preview: is suitable for rendering in a stacked view in combination with one or more other simulated previews of one or more other application plug-ins; comprises information about the associated plug-in (including, but not limited to, purpose of UI elements); includes UI changes such as UI theme, new page flow, additional UI elements, or a combination thereof; is an overlay template, a raster image file, or a vector image file; has a transparency effect permitting concurrent viewing of representation of the one or more user interface changes; is classified and presented on the device based on a functionality category; and/or any combination of the foregoing. A simulated preview associated with a plug-in shows a depiction of UI changes that would be effected on the original and/or host application to which the plug-in is associated without actually implementing any changes to the original and/or host application, other than facilitating simultaneous viewing of the simulated preview and the original and/or host application in operation. In some embodiments, the simulated preview comprises a static image, animated images, or a combination thereof. Animated images can show a preview of changes to UI actions and/or depict changes to UI interactions and can be selected form formats including, but not limited to, animated graphics interchange format (GIF), animated portable network graphics (APNG), WebP modern image format, AV1 Image File Format (AVIF), multiple-image network graphics (MNG), and free lossless image format (FLIF).

As used herein, the term "collision" refers to a conflict between two or more plug-ins operating simultaneously in conjunction with an original or host application. Collisions can range from minor collision, which might result in unintended shading of a portion of the UI, to major collisions, such as loss of functionality of one or more buttons displayed on the UI.

As used herein, the term "collision metric" refers to numerical data gathered related to the collision history of a plug-in, statistical treatment of plug-in collisions and/or characterization of the nature of the collision including, but not limited to, the number of times a plug-in was previewed via one or more simulated previews, the number of times a plug-in was downloaded after one or more simulated previews, the number of times a plug-in was rejected after one or more simulated previews, the number of other plug-ins where a collision was detected by use of simulated previews, the UI element(s) involved in the collision detected by use of simulated previews, the percentage of other plug-ins with which a plug-in is colliding detected by use of simulated previews, and/or the likelihood of collisions of certain UI element. Such collision metrics are made possible and derived from gathering data derived from use of simulated previews.

FIG. 1 is a diagram of a system capable of obtaining a simulated preview that depicts a representation of one or more UI changes associated with an application plug-in and rendering the simulated preview overlaid on a UI of an application executing on a device, according to one embodiment. Extensible applications and super apps allow users to customize the look and/or feel of the application, as well as extending the functionality. However, to find such plug-ins, a user must find and search libraries of plug-ins to locate plug-ins that might provide the desired modifications and/or enhancements to the UI for a particular application. After locating a candidate plug-in, the user must evaluate the plug-in by installing it on the device where the application resides and then using the modified application to determine if such modification improves the application. The user leaves the plug-in installed if they determine the modification is advantageous. However, if the user then decides the plug-in does not provide a desirable change to the application, or even worse that is incompatible with or otherwise deteriorates the function of the application, the user must search the storage on the device to locate the plug-in file and follow appropriate steps to delete the plug-in in a manner that restores prior functionality to the application. The plug-in evaluation process becomes even more complicated and burdensome to the user when multiple plug-ins are available and/or have already been installed on the relevant application. Accordingly, plug-in providers face barriers to user implementation of plug-ins due to the inconvenience of the plug-in evaluation process.

To address this problem, a system 100 of FIG. 1 introduces the capability to customize the look and feel of an extensible application or super app, as well as to extend the functionality of the application, by allowing a phone user to discover available plug-ins and/or install new plug-ins without overwhelming the overall experience of using the application.

Current plug-in discovery mechanisms are basically searchable libraries of content. Once a user finds a desired plug-in, they install it on their phone. Once it is installed, they decide whether the plug-in is a good addition to the application. If the plug-in is not a good addition to the application, the user must remove the plug-in from the phone. To uninstall the plug-in, the user must search for the plug-in by name on the list of extensions installed on the phone and mark it for deletion in a manner that will restore functionality of the host application to is state prior to installation of the plug-in.

In one embodiment, the method and apparatus disclosed herein introduces the capability of showing overlay previews of a plug-in on the display of the operating application, so that the user can see what the plug-in will do to the application without actually installing the plug-in on the phone. In one embodiment, where multiple plug-ins are already installed on a phone, the method and apparatus disclosed herein introduces the capability to uninstall the plug-in by showing the collection of installed plug-ins as a stack of overlays that the user can decide to keep or remove. In some embodiments, this decision can be implemented by user interaction with the user interface of their device, such as, screen swipe left to delete or screen swipe right to keep.

Extensible applications and/or super apps are mobile applications that allow for users to extend their functionality via plug-ins. These plug-ins can implement any number of changes to the original or host application, including, but not limited to, UI theming, new page flows, and/or additional UI elements. Depending on the type of plug-ins an application (extensible application or super app) supports, users and developers need to be equally mindful of the extent to which an application may be changed by one or more plug-ins in order to avoid degrading the overall user experience with visual and/or functional overload. In some instances, plug-ins may collide in that two or more plug-ins may add user interface elements that overlap or conflict, such as trying to add buttons having different functionality to the same part of the screen. In some embodiments, system 100 provides for compiling collision metrics to provide both users and developers information about the likelihood and/or severity of collisions identified by other users of system 100.

The method and apparatus disclosed herein introduces steps of a plug-in discovery and installation process, that allows a user to quickly preview plug-ins and evaluate their impact to the user experience of the application associated with the plug-ins.

As shown in FIG. 1, the system 100 comprises a user equipment ("UE") 113 having connectivity to a plug-in platform 107 via a communication network 109. By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), 5G New Radio networks, Long Term Evolution (LTE) networks, code division multiple access (CDMA), wireless fidelity (WiFi), satellite, mobile ad-hoc network (MANET), and the like.

The UE 113 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof, wherein such UE is suited for running applications. It is also contemplated that the UE 113 can support any type of interface to the user (such as "wearable" circuitry, etc.).

In some embodiments, system 100 implements a method for obtaining a simulated preview that depicts a representation of one or more user interface changes associated with an application plug-in and rendering the simulated preview as an overlay on the UI of an application executing on a device. The rendering aligns the representation of the one or more user interface changes over the UI to depict a preview of the one or more user interface changes that will occur after an installation of the application plug-in. In some of these embodiments:
 a. the simulated preview is rendered in a stacked view in combination with one or more other simulated previews of one or more other application plug-ins,
 b. at least one simulated preview further comprises information about the associated plug-in,
 c. the one or more user interface changes include a user interface theme, a new page flow, an additional user interface element, or a combination thereof,
 d. the simulated preview is an overlay template, a raster image file, or a vector image file,
 e. the simulated preview has a transparency effect permitting concurrent viewing of representation of the one or more user interface changes and the user interface of the application, and/or
 f. the simulated preview is classified and presented on the device based on a functionality category.

In some embodiments, the method further comprises determining one or more installed application plug-ins associated with the application, obtaining one or more other simulated previews of the one or more installed application plug-ins, and rendering the one or more other simulated previews overlaid on the user interface of the application. An interaction with the one or more other simulated previews initiates a modification of an installation of at least one of the one or more installed application plug-ins. In some embodiments, the one or more other simulated previews are rendered in a stacked view overlaid on the user interface.

In some embodiments, the method further comprises determining a collision metric between the one or more user interface changes and at least one user interface element of the user interface of the application, one or more other application plug-ins, or a combination thereof, and providing the collision metric as an output.

In some embodiments, system 100 includes an apparatus comprising at least one processor and at least one memory, including computer program code for one or more programs, configured to cause the apparatus to obtain a simulated preview that depicts a representation of one or more user interface changes associated with an application plug-in and render the simulated preview as an overlay on the UI of an application executing on a device. The rendering aligns the representation of the one or more user interface changes over the UI to depict a preview of the one or more user interface changes that will occur after an installation of the application plug-in. In some of these embodiments:
 a. the simulated preview is rendered in a stacked view in combination with one or more other simulated previews of one or more other application plug-ins,
 b. at least one simulated preview further comprises information about the associated plug-in,
 c. the one or more user interface changes include a user interface theme, a new page flow, an additional user interface element, or a combination thereof,
 d. the simulated preview is an overlay template, a raster image file, or a vector image file,
 e. the simulated preview has a transparency effect permitting concurrent viewing of representation of the one or more user interface changes and the user interface of the application, and/or
 f. the simulated preview is classified and presented on the device based on a functionality category.

In some embodiments, the apparatus is further caused to determine one or more installed application plug-ins associated with the application, obtain one or more other simulated previews of the one or more installed application plug-ins, and render the one or more other simulated previews overlaid on the user interface of the application. An interaction with the one or more other simulated previews initiates a modification of an installation of at least one of the one or more installed application plug-ins. In some embodiments, the one or more other simulated previews are rendered in a stacked view overlaid on the user interface.

In some embodiments, the apparatus is further caused to determine a collision percentage between the one or more user interface changes and at least one user interface element of the user interface of the application, one or more other application plug-ins, or a combination thereof, and provide the collision percentage as an output.

In some embodiments, system 100 includes a non-transitory computer-readable storage medium having stored thereon one or more program instructions which, when executed by one or more processors, cause an apparatus to obtain a simulated preview that depicts a representation of one or more user interface changes associated with an application plug-in and render the simulated preview as an overlay on the UI of an application executing on a device. The rendering aligns the representation of the one or more user interface changes over the UI to depict a preview of the one or more user interface changes that will occur after an installation of the application plug-in. In some of these embodiments:

a. the simulated preview is rendered in a stacked view in combination with one or more other simulated previews of one or more other application plug-ins,
b. at least one simulated preview further comprises information about the associated plug-in,
c. the one or more user interface changes include a user interface theme, a new page flow, an additional user interface element, or a combination thereof,
d. the simulated preview is an overlay template, a raster image file, or a vector image file,
e. the simulated preview has a transparency effect permitting concurrent viewing of representation of the one or more user interface changes and the user interface of the application, and/or
f. the simulated preview is classified and presented on the device based on a functionality category.

In some embodiments, the non-transitory computer-readable storage medium further causes the apparatus to determine one or more installed application plug-ins associated with the application, obtain one or more other simulated previews of the one or more installed application plug-ins, and render the one or more other simulated previews overlaid on the user interface of the application. An interaction with the one or more other simulated previews initiates a modification of an installation of at least one of the one or more installed application plug-ins. In some embodiments, the one or more other simulated previews are rendered in a stacked view overlaid on the user interface.

In some embodiments, the non-transitory computer-readable storage medium further causes the apparatus to determine a collision percentage between the one or more user interface changes and at least one user interface element of the user interface of the application, one or more other application plug-ins, or a combination thereof, and provide the collision percentage as an output.

By way of example, the UE 113, plug-in platform 107, the plug-in repository 103, content providers 119a-119m, services platform 115, geographic database 121, and application 111 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In some embodiments, system is provided with a UE 113 wherein application 111 is operable to produce UI 115 on UE 113 by installation of application 111 on UE 113, by access to application 111 over communication network 109, or a combination thereof.

In some embodiments, system 100 detects plug-in 105a, which is suited to modify one or more aspects of UI 115. Plug-in platform 107 processes plug-in 105a to obtain simulated preview 101a, wherein simulated preview 101a depicts a representation of one or more user interface changes that plug-in 105a would cause to be made on UI 115 if plug-in 105a were to be installed on UE 113. Plug-in platform 107 then causes rendering of the simulated preview 101a overlaid on UI 115 while UI 115 displays application 111 in operation. Plug-in platform 107 further causes alignment of simulated preview 101a and UI 115 to show the changes that would occur to UI 115 if plug-in 105a were to be installed on UE 113. In some embodiments, simulated preview 101a further comprises information about plug-in 105a, including, but not limited to functionality and the purpose of buttons included in plug-in 105a. In some embodiments, UI changes are displayed in simulated preview 101a include, but are not limited to, user interface theme, a new page flow, and an additional user interface element. In some embodiments, the simulated preview 101a is an overlay template, a raster image file, or a vector image file. In some embodiments, the simulated preview is animated, such as, but not limited to, animated GIF, APNG, WebP, AVIF, MNG, or FLIF. In some embodiments, the simulated preview 101a has a transparency effect permitting concurrent viewing of representation of one or more changes to UI 113 that would occur if plug-in 105a were to be installed and the application 111 in operation.

In some embodiments, system 100 detects plug-in 105a, which is suited to modify one or more aspects of UI 115. Plug-in platform 107 processes plug-in 105a to obtain simulated preview 101a, wherein simulated preview 101a depicts a representation of one or more user interface changes that plug-in 105a would cause to be made on UI 115 if plug-in 105a were to be installed on UE 113. Plug-in platform 107 then causes rendering of the simulated preview 101a overlaid on UI 115 while UI 115 displays application 111 in operation. Plug-in platform 107 further causes alignment of simulated preview 101a and UI 115 to show the changes that would occur to UI 115 if plug-in 105a were to be installed on UE 113. Plug-in platform 107 further detects plug-ins associated with application 111 already installed on UE 113. Platform 107 processes data associated with the plug-ins associated with application 111 already installed on UE 113 to obtain simulated previews 101*b*-101*m* associated with those plug-ins. Plug-in 107 causes simulated previews 101*b*-101*m* to be rendered on UE 115 along with simulated preview 101*a*. Interaction with one of more of simulated previews 101*a*-101*m* initiates a modification of the installation of one or more plug-ins 105*a*-105*m*, respectively. In some embodiments, simulated previews 101*a*-101*m* further comprise information about plug-ins 105*a*-105*m*, respectively, including, but not limited to functionality and the purpose of buttons included in plug-ins 105*a*-105*m*. In some embodiments, UI changes are displayed in simulated previews 101*a*-105*m* include, but are not limited to, user interface themes, new page flows, and additional user interface elements. In some embodiments, the simulated previews 101*a*-105*m* are overlay templates, raster image files, or vector image files. In some embodiments, the simulated preview is animated, such as, but not limited to, animated GIF, APNG, WebP, AVIF, MNG, or FLIF. In some embodiments, the simulated previews 101*a*-101*m* each have a transparency effect permitting concurrent viewing of representation of one or more changes to UI 113 that would occur if plug-ins 105*a*-105*m* were to be installed and the application 111 in operation.

In some embodiments, system 100 detects plug-in 105*a*, which is suited to modify one or more aspects of UI 115. Plug-in platform 107 processes plug-in 105*a* to obtain simulated preview 101*a*, wherein simulated preview 101*a* depicts a representation of one or more user interface changes that plug-in 105*a* would cause to be made on UI 115 if plug-in 105*a* were to be installed on UE 113. Plug-in platform 107 then causes rendering of the simulated preview 101*a* overlaid on UI 115 while UI 115 displays application 111 in operation. Plug-in platform 107 further causes alignment of simulated preview 101*a* and UI 115 to show the changes that would occur to UI 115 if plug-in 105*a* were to be installed on UE 113. Plug-in platform 107 further detects plug-ins associated with application 111 already installed on UE 113. Platform 107 determines a collision percentage between the changes that would occur to UI 115 if plug-in 105*a* were to be installed on UE 113 and at least one UI element of application 101 and/or at least one UI element of one or more of the plug-ins associated with simulated previews 101*b*-101*m*.

In some embodiments, plug-in platform 107 retrieves one or more of plug-ins 105*a*-105*m* from plug-in repository 103. Plug-in platform 107 processes the one or more of plug-ins 105*a*-105*m* to obtain simulated previews one or more of 101*a*-101*m* corresponding to the one or more of plug-ins 105*a*-105*m* retrieved form plug-in repository 103.

In some embodiments, the user might obtain and install on their device a map application having a minimal user interface that is intended to be enhanced for specific user preferences. In this scenario, a user might browse simulated previews that have been organized into groups that characterize the function of the plug-ins. For instance, some plug-ins may add a button and highlight portions of the user's screen (UI 115 of UE 113) with a particular color scheme to identify restaurants, coffee shops, hardware stores, and/or grocery stores and/or routing information to each such location. In another instance, plug-ins might add prompts to show all hardware stores and identify store of each company in a different color. The simulated previews of system 100 would provide information to the user regarding collisions, such as, but not limited to, conflicts between buttons (e.g., two plug-ins utilizing the same part of the screen of collision and/or highlighting colors (e.g., two plug-ins marking hardware stores and coffee shops with the same color, thus degrading the intended purpose of both plug-ins). If there are no collisions or no major collisions and the preview of functionality is deemed desirable, the user can install the plug-in by simple interaction with UI 115, such as, but not limited to, a screen swipe in a designated direction or a screen prompt provided in the simulated preview. If there are collisions deemed unacceptable by the user, the user can delete the simulated preview and reject installation of the plug-in by simple interaction with UI 115, such as, but not limited to, a screen swipe in a designated direction or a screen prompt provided in the simulated preview. Data regarding the nature of the collisions and whether the user rejected or added the previewed plug-ins would be recorded by system 100 for use by plug-in developers.

In some embodiments, system 100 categorizes plug-ins by functionality and provides a catalog of associated simulated previews, based on input from a user. In some instances, a restaurant owner may review potential plug-in UI enhancements to a mapping application to show location of various customers. In some instances, a food delivery driver may review potential plug-in UI enhancements to a mapping application to show location of restaurants and various orders to be picked up and delivered. In some instances, a customer may review potential plug-in UI enhancements to a mapping application to show location of restaurants and whether various menu items are available.

In some embodiments, a simulated preview 101*a* can be overlaid on the view of application 111 by way of an application programming interface ("API") that temporarily modifies the application 111 to permit showing the simulated preview within the application 111. In this instance, the API is suited to provide an overlay view of one or more plug-ins 101*a*-101*m* on the view of the operating application 111 on UI 115 without downloading and/or installing the one or more plug-ins on UE 113.

Figure 2:
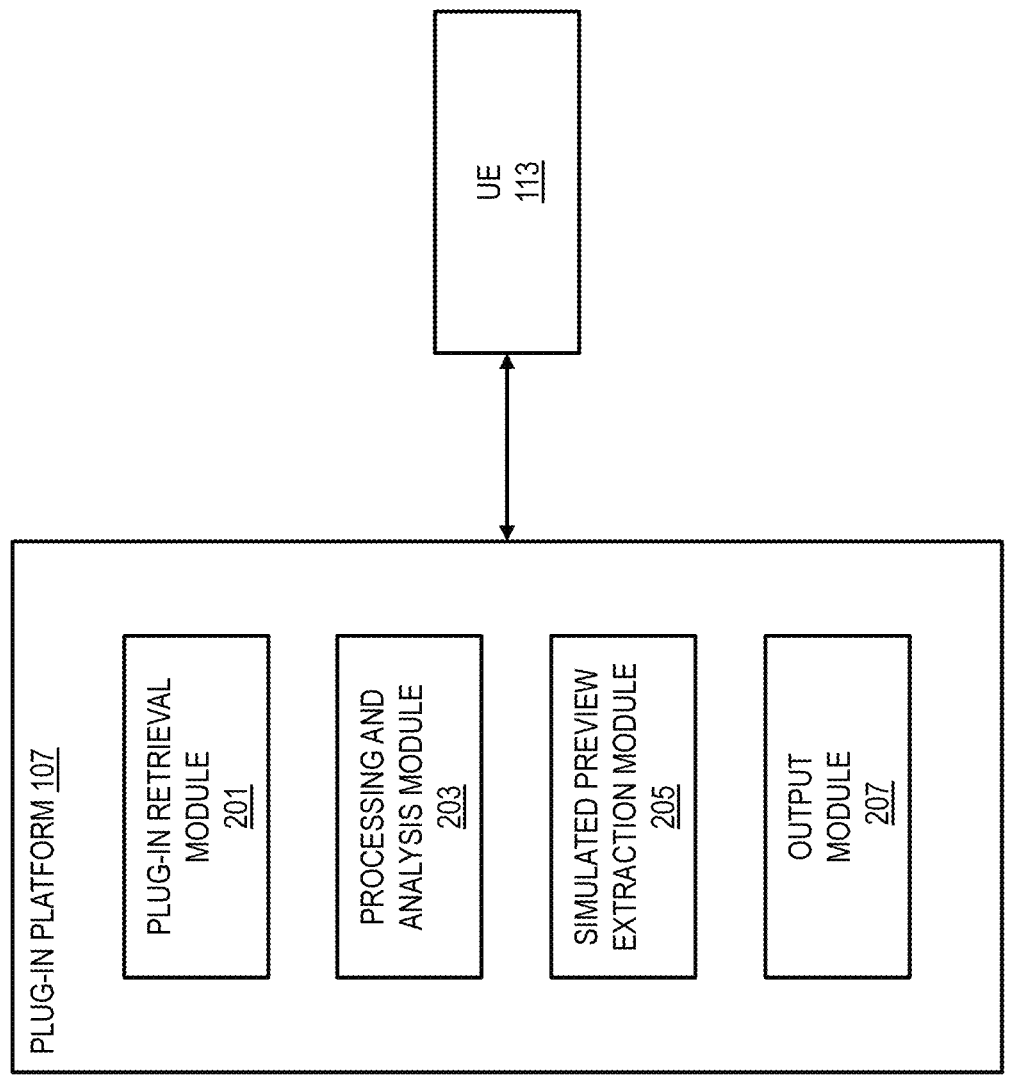
FIG. 2 is a diagram of the components of a plug-in platform capable of providing plug-in management via simulated previews, according to one embodiment.

FIG. 2 is a diagram of the components of the plug-in platform 107, according to one embodiment. By way of example, the plug-in platform 107 includes one or more components for obtaining a simulated preview that depicts a representation of one or more user interface changes associated with an application plug in; and rendering the simulated preview overlaid on a user interface of an application executing on a device. The rendering aligns the representation of the one or more user interface changes over the user interface to depict a preview of the one or more user interface changes that will occur after an installation of the application plug in. In some embodiments, plug-in platform 107 determines one or more installed application plug ins associated with the application, obtains one or more other simulated previews of the one or more installed application plug ins, and renders the one or more other simulated previews overlaid on the user interface of the application. An interaction with the one or more other simulated previews initiates a modification of an installation of at least one of the one or more installed application plug ins.

It is contemplated that the functions of these components may be combined in one or more components or performed by other components of equivalent functionality. In this embodiment, the plug-in platform 107 includes a plug-in retrieval module 201, a processing and analysis module 203, a simulated preview extraction module 205, an output module 207, and has connectivity to UE 113. The above presented modules and components of the plug-in platform 107 can be implemented in hardware, firmware, software, or a combination thereof. Though depicted as a separate entity in FIG. 1, it is contemplated that the plug-in platform 107 may be implemented as a module of any other component of the system 100. In another embodiment, the plug-in platform 107 and/or the modules 201-207 may be implemented as a cloud-based service, local service, native application, or combination thereof. The functions of the plug-in platform 107 and/or the modules 201-207 are discussed with respect to FIG. 3.

Figure 7:
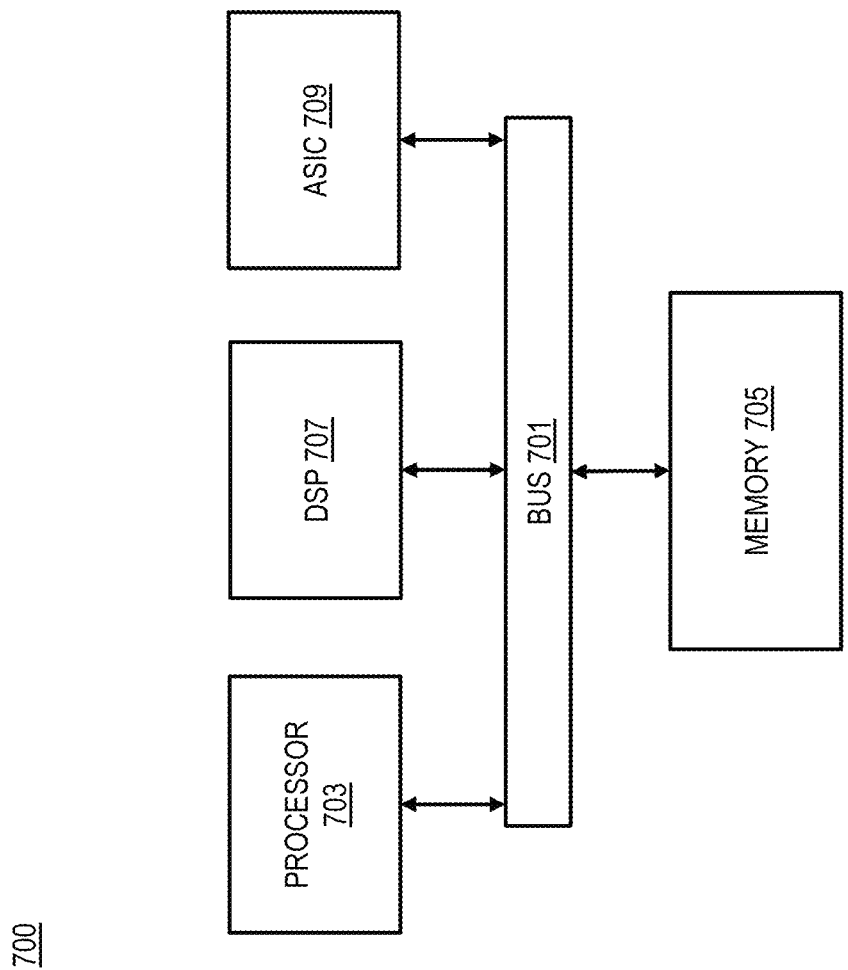
FIG. 7 is a diagram of a chip set that can be used to implement an embodiment.

FIG. 3 is a flowchart of a process for obtaining a simulated preview 101a of a plug-in 105a for application 111, wherein simulated preview 101a depicts a representation of one or more user interface changes that plug-in 105a would cause to be made on UI 115 if plug-in 105a were to be installed on UE 113. Plug-in platform 107 then causes rendering of the simulated preview 101a overlaid on UI 115 while UI 115 displays application 111 in operation. Plug-in platform 107 further causes alignment of simulated preview 101a and UI 115 to show the changes that would occur to UI 115 if plug-in 105a were to be installed on UE 113, according to some embodiments. In various embodiments, the plug-in platform 107, the machine learning system 129, and/or any of the modules 201-207 may perform one or more portions of the process 300 and may be implemented in, for instance, a chip set including a processor and a memory as shown in FIG. 7. As such, the plug-in platform 107 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all the illustrated steps.

In step 301, the plug-in retrieval module 201 obtains plug-in 105a for evaluation of installation in conjunction with application 111. Plug-in 105a is processed by processing and analysis module 203 and/or simulated preview extraction module 205 to obtain representations of one or more changes that would occur in one or more to UI 115 display of application 111 in operation if plug-in 105a were installed on UE 113.

In step 303, simulated preview extraction module 205 and/or output module 207 cause a rendering of simulated preview 101a overlaid on UI 115 display showing application 111 in operation. Simulated preview extraction module 205 and/or output module 207 further cause alignment of simulated preview 105a and a display of application 111 in operation simultaneously on UE 115 to show the user a visual image of how application 111 would be altered by plug-in 105a without actually installing plug-in 105a on UE 113.

In step 305, processing and analysis module 203 determines one or more installed plug-ins on UE 113. Based on the determination of plug-ins installed on UE 113, plug-in retrieval module 201 retrieves plug-ins that are installed on UE 113 from plug-in repository 103. Processing and analysis module 203 and simulated preview extraction module 205 provide one or more simulated previews 101b-101m associated with the plug-ins already installed on UE 113.

In step 307, simulated preview extraction module 205 and/or output module 207 cause a rendering of one or more simulated previews 101b-101m overlaid on UI 115 display showing application 111 in operation. Simulated preview extraction module 205 and/or output module 207 further cause alignment of one or more simulated previews 105b-101m and a display of application 111 in operation simultaneously on UE 115 to show the user a visual image of how application 111 would be altered by one or more plug-ins 105b-105m. Interaction with one or more simulated previews 101b-101m initiates a modification of an installation of at least one of the one or more plug-ins 105b-105m installed on UE 113. For example, a finger swipe in the appropriate direction to one or more simulated previews 101b-101m would facilitate removal of the related one or more plug-ins 105b-105m.

In step 309, processing and analysis module 203 determines a collision percentage between one or more UI changes and at least and at least one UI of the application 111 and/or one or more plug-ins 105b-105m already installed on UE 113. Output module 207 provides the calculated collision percentage as an output from system 100.

FIGS. 4A-4J are diagrams of user interfaces utilized in the processes of FIG. 3, according to various embodiments.

Single Plug-In Installation with Preview

A scenario for single plug-in installation with preview is shown in FIGS. 4A-4F. In one instance, as shown in FIGS. 4A-4C, a user wishes to evaluate a first candidate plug-in before installing. Plug-ins can be accessed by a number of known means, but FIG. 4A shows an increasingly popular method for accessing web addresses, such as for obtaining a plug-in, that being enablement of UE 113 to scan a QR code to obtain a link. In the embodiment shown by FIGS. 4A-4C, a user scans a QR code, which embeds a link to the plug-in with a prompt for installing the plug-in. In FIG. 4B, UI 115 displays a simulated preview of the first candidate plug-in being previewed overlaid on the operating application associated with the plug-in (reference numbers not shown to limit clutter in FIG. 4B). The simulated preview of the first candidate plug-in has a transparency to allow concurrent viewing of UI elements 401a and 401b superimposed on the operating application. The simulated preview might also show information about the plug-in, such as, but not limited to, the purpose of buttons associated with the plug-in. The user is provided with the opportunity to see the plugin in action with respect to the host application and any installed plug-ins. If the user decides not to install the plug-in, system 100 allows the user to avoid the burdensome steps of actually downloading and installing the plug-in, testing its operation, and then searching for the plug-in and implementing the appropriate deletion procedure. If the user decides to install the plug-in, system 100 provides convenient prompts on UI 115 to accept and install the plug-in. In the instance shown in FIG. 4B, system 100 displays optional call-outs 403a and 403b on UI 115. These call-outs inform the user about the functions of the UI elements 401a and 401b, respectively, of a first candidate plug-in. The depiction of UI 115 in FIG. 4B is a pre-installation view of the first candidate plug-in when no other plug-ins have been installed. FIG. 4C shows UI 115 after installation of the first candidate plug-in after user engagement with control button 405, which is an active field in the simulated preview associated with the first candidate plug-in. FIG. 4B can include an option to cancel by way of a "cancel plug-in" control button similar to "install plug-in" control button 405 to (or such removal may be performed implicitly done by other user interaction with UI 115, including but not limited to clicking, swiping, or double-tapping UI 115 or by engaging other hardware buttons on UE 113. In any event, system 100 provides means for the user to interact with UI 115 to cancel the preview and revert to the UI original application and/or installed plug-ins.

In another instance, as shown in FIGS. 4D-4F, a second candidate plug-in is accessed by a QR code shown on UI 115 of UE 113, as shown in FIG. 4D. In the embodiment shown by FIGS. 4D-4F, a user scans a QR code, which embeds a link to the second candidate plug-in with a prompt for installing the plug-in. In FIG. 4E, UI 115 displays a simulated preview of the second candidate plug-in being previewed overlaid on the operating application associated with the second candidate plug-in, wherein the first candidate plug-in has been installed. The simulated preview of the second candidate plug-in has a transparency to allow concurrent viewing of UI element 401c, associated with the second candidate plug-in, superimposed on the operating application and installed first candidate plug-in. In the instance shown in FIG. 4E, system 100 identified a collision between UI element 401c, associated with the second candidate plug-in, and UI element 401b, associated with the first candidate plug-in (shown in shadow in FIG. 4E and shown clearly in FIG. 4F after the second candidate plug-in has been rejected. Call-out 403c informs the user of the collision between UI elements 401b and 401c and provides information about the nature of the collision. System 100 provides means for the user to interact with UI 115 to cancel the simulated preview of the second candidate plug-in and revert to the UI of the original application with the first candidate plug-in having been installed. In some embodiments, system 100 provides means for the user to interact with UI 115 to select whether to keep the installed first candidate plug-in and terminate the preview of the second candidate plug-in or to install the second candidate plug-in and delete the previously installed first candidate plug-in.

The simulated preview can be delivered using overlay templates, or by means of a raster or vector image file, which contains an image of the plug-in UI controls (buttons, widgets, sliders, text boxes, etc.) and their positions on the UL The image file may have a transparency or an alpha channel that allows the underlying host application UI to be seen simultaneously with the simulated preview. Alternatively, the UI control images associated with the plug-in being previewed can be delivered along with their positions on the host app UI. In some embodiments, the simulated preview is animated, such as, but not limited to, animated GIF, APNG, WebP, AVIF, MNG, or FLIF.

The different plug-ins can also be classified based on their functionality. For instance, on a host map application, different map search plugins could be used alongside different shared vehicle applications. However, it is likely that a user will only have need for a few plug-ins of each category to be installed. The classification would allow for comparing plug-in preview overlays of one type of plug-in, aiding the users in deciding which plug-ins to install and/or keep. Plug-in overlays can then be compared with plug-ins of their own type and with other plug-ins currently installed or under consideration by the user.

From the viewpoint of a plug-in developer, system 100 could provide means of users to provide feedback to developers based on experience using the UI overlay. For example, system 100 could compile statistics based on user feedback collected by system 100 and provide feedback to a developer such as, "Your transit UI button "X" is colliding with 65% of other plug-in UIs." If plug-in usage statistics are available, a developer would be provided with the collision metrics as well as the likelihood of such collisions, so the developer could choose to, for example, place buttons in the developer's plug-in the same location where another niche plug-in places its controls.

Plug-In Management

When deleting plug-ins associated with an application, the current state of the art is to search files on UE 113 go find a plug-in to be deleted by name in a list of installed plug-ins and remove it by a process recommended for that plug-in. System 100 leverages the use of simulated previews by displaying them as a stack of overlays on the view of the operation application displayed on UI 115 of UE 113. In the stack of overlays, system 100 facilitates deletion selected plug-ins by interaction of the user with UI 115, such as, but not limited to, a screen swipe. Plug-in management is thereby simplified by system 100 by allowing users to perform plug-in administrative operations intuitively, without the need to understand the details of how plug-ins work or where and how plug-in application files are stored. FIG. 4G shows simulated previews 101c-101d overlaid on UI 115 of UE 113, displaying application 111 in operation along with UI elements 401b, 401c, and 401d. FIG. 4H shows a depiction of user interaction with UI 115 Plug-in Discovery System 100 simplifies "browsing" for available plug-ins by leveraging the use of simulated previews. In this instance, system 100 provides a catalog of available plug-ins of a given type or classification of plug-in associated with a particular application. FIG. 4I shows a group of simulated previews 101b-101j corresponding to the available plug-ins of a given type or classification of plug-in associated with a particular application obtained by search criteria input by a user. In some instances, plug-ins of certain type or classification would not be used with plug-ins of a different type or classification. For example, plug-ins associated with a hiking application would not be used simultaneously with plug-ins associated with a shared vehicle application. Therefore, browsing by plug-in type or classification would reduce the probability of rejecting a desirable plug-in based on collisions with other plug-ins that would not be operated in conjunction with the desirable plug-in. System 100 can make discovering new functionality form plug-ins an intuitive, visual experience by allowing to user to preview individual and/or combinations of simulated previews to determine a preferred one or more plug-ins prior to downloading or installing any plug-ins. Leveraging once again the plug-in simulated previews, plug-in directories of various size and scope can be compiled and browsed by navigation each preview on the UI 115 of UE 113. Users could then experience available plugins much faster than individually downloading and installing them.

Figure 5:
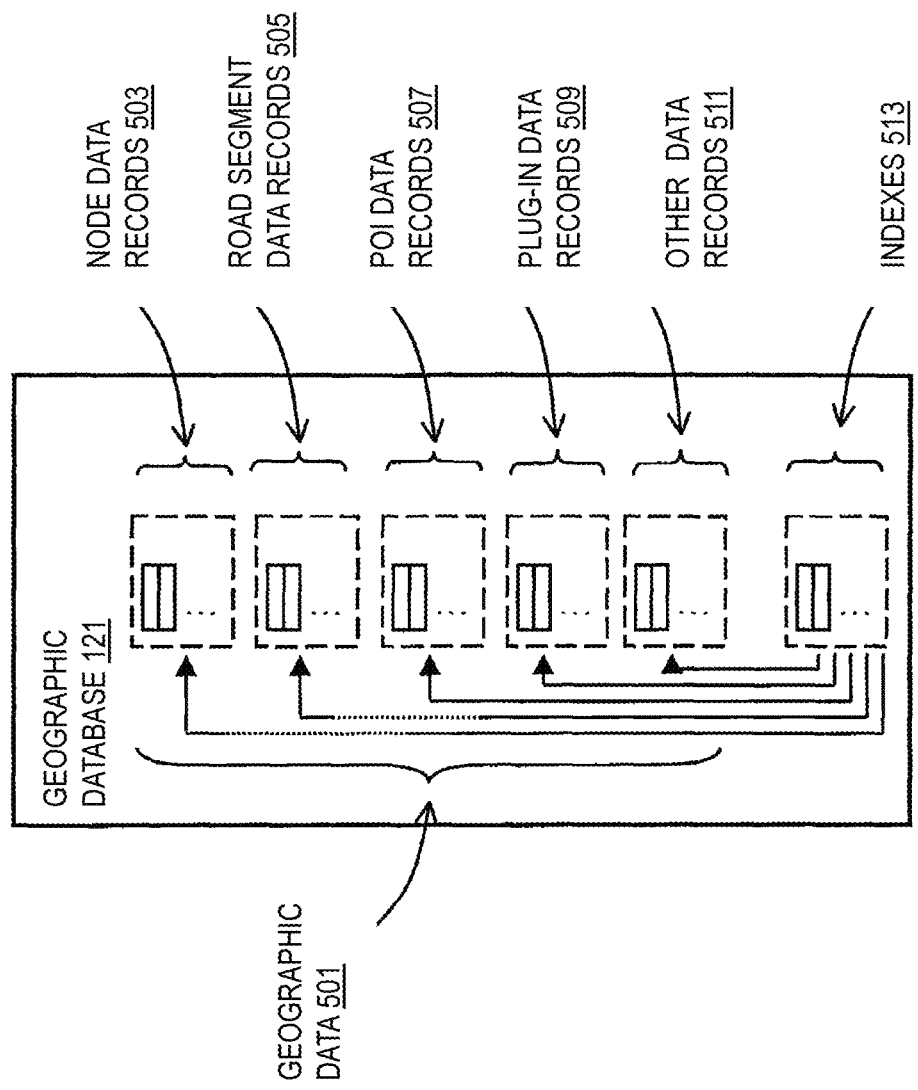
FIG. 5 is a diagram of a geographic database that can be used to implement an embodiment.

FIG. 5 is a diagram of a geographic database (e.g., the geographic database 109), according to example embodiment(s). In one embodiment, the geographic database 109 includes geographic data 501 used for (or configured to be compiled to be used for) predicting one or more cornering spots and/or one or more attributes of one or more cornering spots. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"— A point that terminates a link.

"Line segment"— A straight line connecting two points.

"Link" (or "edge")—A contiguous, non-branching string of one or more-line segments terminating in a node at each end.

"Shape point"— A point along a link between two nodes (e.g., used to alter a shape of the link without defining new nodes).

"Oriented link"— A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon (e.g., a hexagon) is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links (e.g., links 111) do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 503, road segment or link data records 505, POI data records 507, plug-in data records 509, other records 511, and indexes 513, for example. More, fewer, or different data records can be provided. In one embodiment, additional data records (not shown) can include cartographic ("cartel") data records, routing data, and maneuver data. In one embodiment, the indexes 513 may improve the speed of data retrieval operations in the geographic database 109. In one embodiment, the indexes 513 may be used to quickly locate data without having to search every row in the geographic database 109 every time it is accessed. For example, in one embodiment, the indexes 513 can be a spatial index of the polygon points associated with stored feature polygons.

In exemplary embodiments, the road segment data records 505 are links or segments representing roads (e.g., roads or links 111), streets, or paths (e.g., that are unique to an area) that can be used for predicting damage area zones for property 119, vehicles 101, people 121, or a combination thereof located on or near the roads or the links 111 of an area (e.g., as represented by the digital map 113). The node data records 503 are end points corresponding to the respective links or segments of the road segment data records 505. The road link data records 505 and the node data records 503 represent a road network, such as used by vehicles 101 and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, average property 119 costs, speed limits, turn restrictions at intersections, and other navigation related attributes, as well as POIs, such as a restaurant, a retail shop, an office, etc. The geographic database 109 can include data about the POIs and their respective locations in the POI data records 507. In one embodiment, the POI data records 507 can include population density data (e.g., foot traffic), hours of operation, popularity or preference data, prices, ratings, reviews, and various other attributes. The geographic database 109 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a portion of a city).

In one embodiment, the geographic database 109 includes plug-in data records 509 including property cost information as well as building material information for the properties 119 in a given area (e.g., properties 119 located on a road or a link 111); vehicle cost information as well as vehicle strength and vehicle durability information for the vehicles 101 in a given area (e.g., driving, stopped, or parked on a road or a link 111); people cost information (e.g., based on actuarial tables) as well as individual property cost information (e.g., mobile devices, shared scooters, etc.) for the people 121 in a given area (e.g., pedestrians, occupants of a property 119 or a vehicle 101, etc.). In one instance, the plug-in data records 509 can also include maximum and minimum threshold values (e.g., based on historic averages, means, etc.). In one instance, the plug-in data records 509 can include both the predicted costs and the actual costs based on a subsequent accident involving a vehicle 101 that the machine learning system 125 can use for training and testing purposes (e.g., in connection with the training module 211 of the mapping platform 103). In one instance, the plug-in data records 509 can include rankings, probabilities, weights or weighting schemes, labeled and/or marked features and attributes, and/or any other related data. In one embodiment, the plug-in data records 509 can be associated with one or more of the node data records 503, road segment or link records 505, and/or POI data records 507; or portions thereof (e.g., smaller or different segments than indicated in the road segment records 505) to predict damage area zones for a vehicle to avoid in case of an accident.

In one embodiment, the geographic database 109 can be maintained by the services platform 127 (e.g., a map developer). The map developer can collect human movement data to generate and enhance the geographic database 109. There can be different ways used by the map developer to collect data. These ways can include obtaining data from other sources, such as municipalities or respective authorities (e.g., city real estate records, vehicle registration records, etc.). In addition, the map developer can employ field personnel to travel by a vehicle 101 (e.g., an autonomous or semi-autonomous vehicle) along a road or a link 111 throughout an area of interest (e.g., the digital map 113) to observe and/or record information regarding the properties 119, vehicles 101, and/or people 121 in the area. Similarly, the map developer can employ field personnel to travel by foot throughout an area of interest (e.g., the digital map 113) to observe and/or record information regarding the properties 119, vehicles 101, and/or people 121 in the area. Also, remote sensing, such as aerial or satellite photography (e.g., from the satellites 133), can be used.

In one embodiment, the geographic database 109 include high resolution or high definition (HD) mapping data that provide centimeter-level or better accuracy of geographic features. For example, the geographic database 109 can be based on LiDAR or equivalent technology to collect billions of 3D points and model road surfaces and other geographic features down to the number lanes and their widths. In one embodiment, the HD mapping data capture and store details such as the slope and curvature of the road, lane markings, roadside objects such as signposts, including what the signage denotes. By way of example, the HD mapping data enable highly automated vehicles 101 to precisely localize themselves on a road, and to determine the road attributes (e.g., direction of traffic) at high accuracy levels.

In one embodiment, the geographic database 109 is stored as a hierarchical or multi-level tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101, a vehicle sensor 107, a UE 115, a device sensor 117, and/or an application 123. The navigation-related functions can correspond to vehicle navigation (e.g., a drone), pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for detecting cornering spots and determining their respective attributes may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
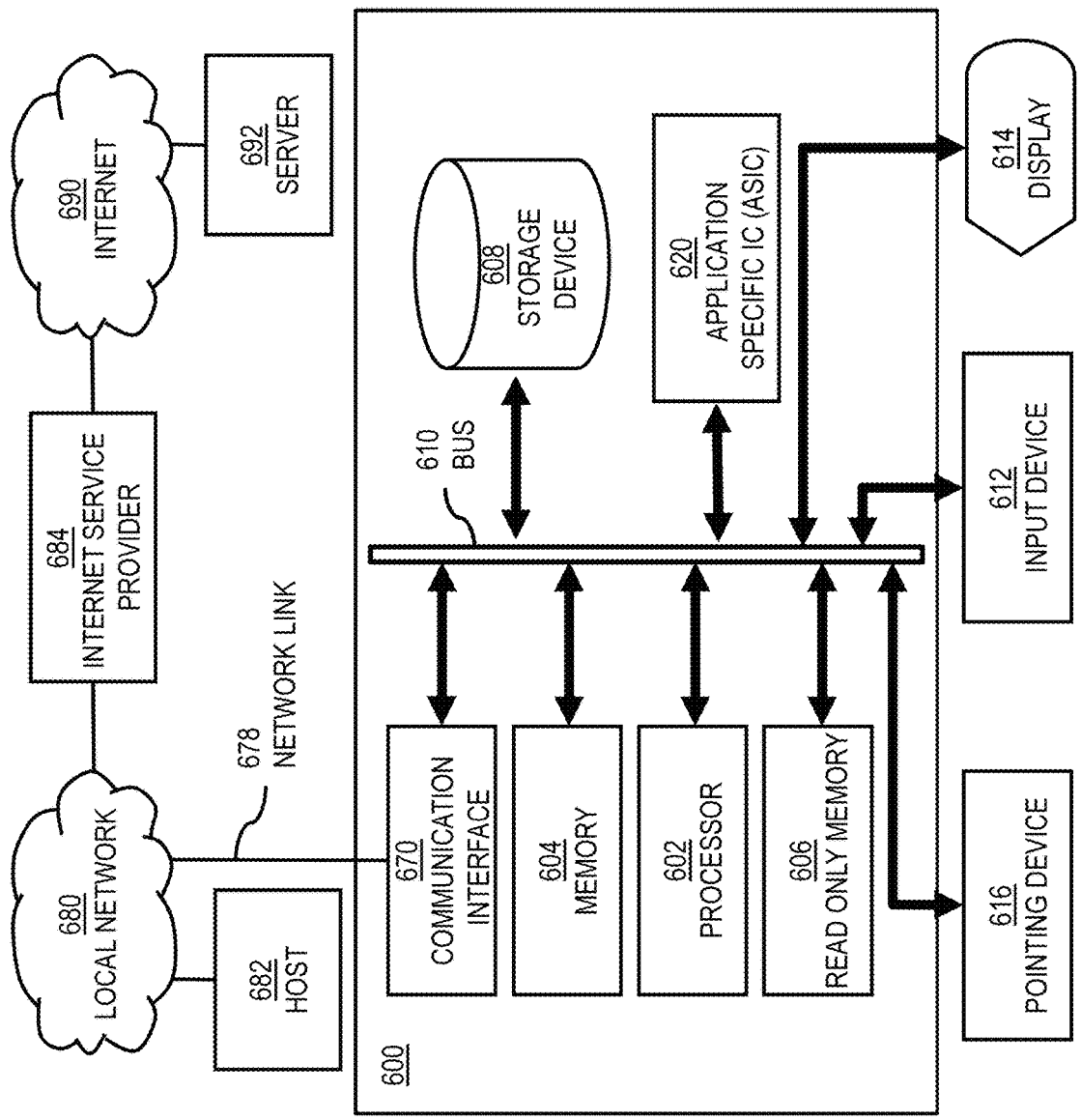
FIG. 6 is a diagram of hardware that can be used to implement an embodiment.

FIG. 6 illustrates a computer system 600 upon which an embodiment of the invention may be implemented. Computer system 600 is programmed (e.g., via computer program code or instructions) to management of plug-ins in terms of evaluating both potential installation of new plug-ins and/or maintenance of exist plug-in inventories as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to management of plug-ins in terms of evaluating both potential installation of new plug-ins and/or maintenance of exist plug-in inventories. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RANI) or other dynamic storage device, stores information including processor instructions for management of plug-ins in terms of evaluating both potential installation of new plug-ins and/or maintenance of exist plug-in inventories. Dynamic memory allows information stored therein to be changed by the computer system 600. RANI allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for management of plug-ins in terms of evaluating both potential installation of new plug-ins and/or maintenance of exist plug-in inventories, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 109 for management of plug-ins in terms of evaluating both potential installation of new plug-ins and/or maintenance of exist plug-in inventories to the UE 113.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system can be deployed in various configurations within other computer systems, e.g., host 682 and server 692.

FIG. 7 illustrates a chip set 700 upon which an embodiment of the invention may be implemented. Chip set 700 is programmed to provide management of plug-ins in terms of evaluating both potential installation of new plug-ins and/or maintenance of exist plug-in inventories as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide management of plug-ins in terms of evaluating both potential installation of new plug-ins and/or maintenance of exist plug-in inventories. The memory 705 also stores the data associated with or generated by the execution of the inventive steps.

Figure 8:
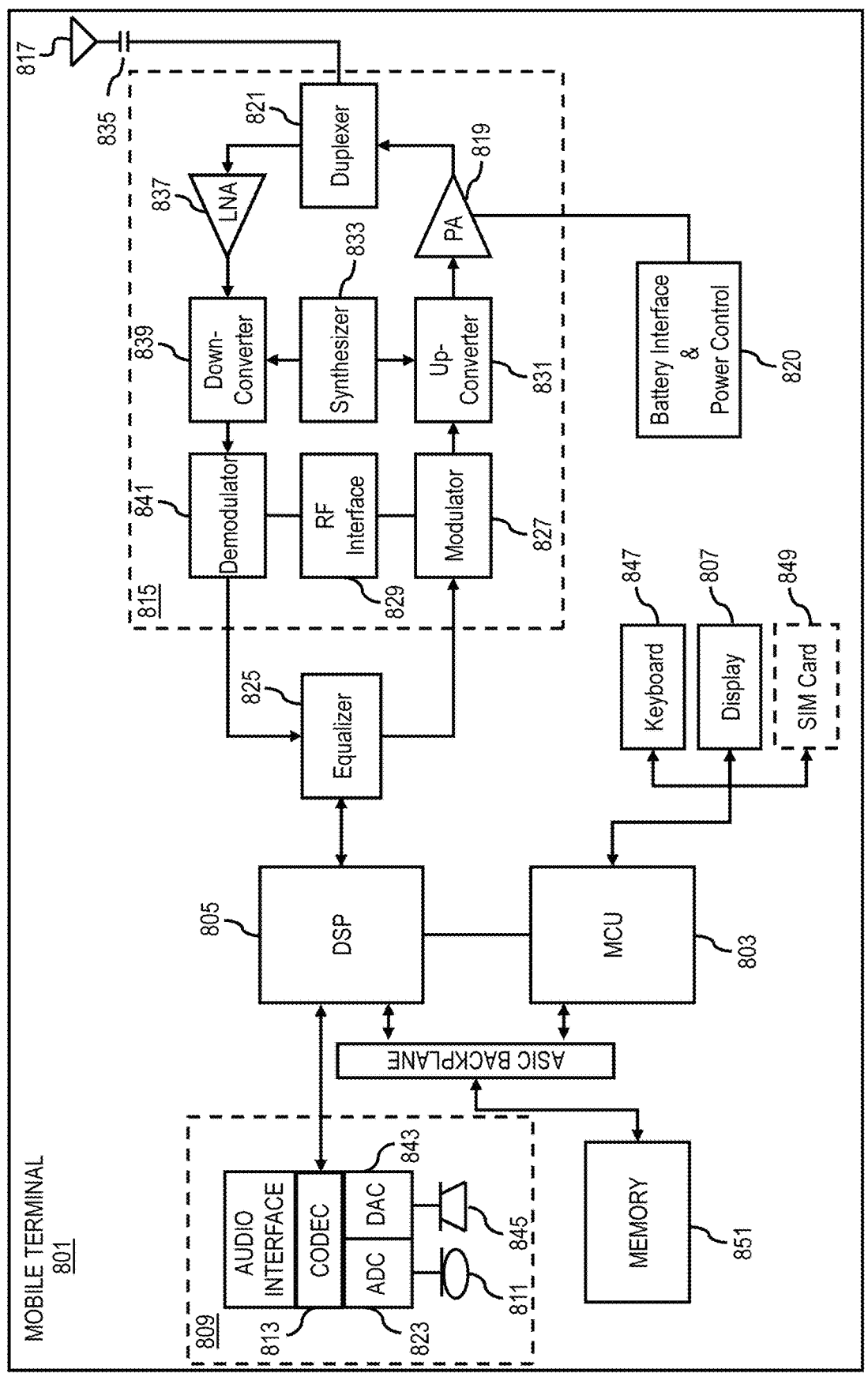
FIG. 8 is a diagram of a mobile station (e.g., handset) that can be used to implement an embodiment.

FIG. 8 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to provide management of plug-ins in terms of evaluating both potential installation of new plug-ins and/or maintenance of exist plug-in inventories. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   obtaining a simulated preview that depicts a representation of one or more user interface changes associated with an application plug-in;
   obtaining one or more additional simulated previews that depict one or more additional representations of one or more additional user interface changes associated with one or more additional application plug-ins; and
   rendering the simulated preview and the one or more additional simulated previews overlaid on a user interface of an application executing on a device,
   wherein the simulated preview and the one or more additional simulated previews are rendered in a stacked view, and wherein the stacked view superimposes the simulated preview and the one or more additional simulated previews over the user interface, and
   wherein the rendering aligns the representation of the one or more user interface changes over the user interface to depict a preview of the one or more user interface changes that will occur after an installation of the application plug-in.

2. The method of claim 1, further comprising:
   determining one or more installed application plug-ins associated with the application;
   obtaining one or more other simulated previews of the one or more installed application plug-ins; and
   rendering the one or more other simulated previews overlaid on the user interface of the application,
   wherein an interaction with the one or more other simulated previews initiates a modification of an installation of at least one of the one or more installed application plug-ins.

3. The method of claim 1, wherein the one or more additional simulated previews have a transparency channel for rendering in the stacked view.

4. The method of claim 1, further comprising:
   determining a collision percentage between the one or more user interface controls of the application plug-in and one or more additional user interface controls of the one or more additional application plug-ins.

5. The method of claim 1, wherein at least one simulated preview further comprises information about one or more functions of one or more user interface elements of the associated plug-in, and wherein the information is presented as a call-out user display associated respectively with the one or more user interface elements.

6. The method of claim 1, wherein the one or more user interface changes include a user interface theme, a new page flow, an additional user interface element, or a combination thereof.

7. The method of claim 1, wherein the simulated preview is an overlay template, a raster image file, or a vector image file.

8. The method of claim 1, wherein the simulated preview is an animated depiction of changes to user interface actions, interactions, or a combination thereof.

9. The method of claim 1, wherein the simulated preview has a transparency effect permitting concurrent viewing of representation of the one or more user interface changes and the user interface of the application.

10. The method of claim 1, wherein the simulated preview is classified and presented on the device based on a functionality category.

11. An apparatus comprising:
at least one processor; and
at least one memory including computer program code for one or more programs, the at least one memory and the computer program code configured to, with the at least one processor, cause the apparatus to:
determine a plurality of installed application plug-ins associated with an application, wherein the plurality of installed application plug-ins extend a user interface of the application and are separate from the application;
retrieve a plurality of simulated previews of the plurality of installed application plug-ins, wherein the one or more simulated previews respectively depict a representation of one or more user interface changes associated with each of the plurality of installed application plug-ins; and
render the one or more simulated previews overlaid on the user interface of the application executing on a device to depict a preview of the one or more user interface changes,
wherein the one or more simulated previews are rendered in a stacked view, and wherein the stacked view superimposes each of the plurality of simulated previews over each other and the user interface, and
wherein the rendering aligns the representation of the one or more other user interface changes of each of the one or more simulated previews over the user interface to depict a preview of the one or more user interface changes associated with each of the one or more installed application plug-ins.

12. The apparatus of claim 11, wherein an interaction with the one or more other simulated previews initiates a modification of an installation of at least one of the one or more installed application plug-ins.

13. The apparatus of claim 11, wherein the apparatus is further caused to:
obtain another simulated preview that depicts a representation of one or more other user interface changes associated another application plug-in that has not been installed; and
render the another simulated preview overlaid on the user interface of the application,
wherein the rendering aligns the representation of the one or more other user interface changes over the user interface to depict a preview of the one or more user interface changes that will occur after an installation of the application plug-in.

14. The apparatus of claim 13, wherein the another simulated preview is rendered in the stacked view in combination with one or more other simulated previews of one or more other application plug-ins that have not been installed.

15. A non-transitory computer-readable storage medium having stored thereon one or more program instructions which, when executed by one or more processors, cause an apparatus to at least:
obtain a simulated preview that depicts a representation of one or more user interface changes associated with an application plug-in;
obtain one or more additional simulated previews that depict one or more additional representations of one or more additional user interface changes associated with one or more additional application plug-ins; and
render the simulated preview and the one or more additional simulated previews overlaid on a user interface of an application executing on a device,
wherein the simulated preview and the one or more additional simulated previews are rendered in a stacked view, and wherein the stacked view superimposes the simulated preview and the one or more additional simulated previews over the user interface, and
wherein the rendering aligns the representation of the one or more user interface changes over the user interface to depict a preview of the one or more user interface changes that will occur to the user interface after an installation of the application plug-in.

16. The non-transitory computer-readable storage medium of claim 15, wherein the apparatus is further caused to:
determine one or more installed application plug-ins associated with the application;
obtain one or more other simulated previews of the one or more installed application plug-ins; and
render the one or more other simulated previews overlaid on the user interface of the application,
wherein an interaction with the one or more other simulated previews initiates a modification of an installation of at least one of the one or more installed application plug-ins.

17. The non-transitory computer-readable storage medium of claim 15, wherein the one or more additional simulated previews have a transparency channel for rendering in the stacked view.

* * * * *